United States Patent Office 2,937,197
Patented May 17, 1960

2,937,197

PROCESS OF PRODUCING TEREPHTHALIC ACID MONO-(β-HYDROXY ETHYL) ESTER AND ITS METAL SALTS

Ewald Katzschmann, Dortmund-Kruckel, Germany, assignor to Chemische Werke Witten Gesellschaft mit beschränkter Haftung, Witten (Ruhr), Germany, a corporation of Germany No Drawing. Application November 18, 1957
Serial No. 696,923

Claims priority, application Germany November 21, 1956

6 Claims. (Cl. 260—475)

The present invention relates to an improved process of producing terephthalic acid mono-(β-hydroxy ethyl) ester.

It is one object of this invention to provide a simple and very effective process of producing highly purified terephthalic acid mono-(β-hydroxy ethyl) ester.

Other objects of the present invention and advantageous features thereof will become apparent as the description proceeds.

In principle, the process according to the present invention consists in re-esterifying an alkali metal salt of the mono-esters of terephthalic acid with monovalent alcohols by heating with ethylene glycol and converting the resulting alkali metal salt of the β-hydroxy ethyl mono-ester of terephthalic acid which is readily soluble in ethylene glycol, by metathesis by means of a soluble alkaline earth metal salt into the corresponding alkaline earth metal salt of the β-hydroxy ethyl mono-ester of terephthalic acid which is difficultly soluble in ethylene glycol. Thereafter, if required, excess ethylene glycol is removed and the precipitated alkaline earth metal salt is decomposed in aqueous suspension by the addition of strong acids.

Especially suitable mono-esters of terephthalic acid are mono-esters with lower alkanols such as ethanol, propanol, butanol and the like. The preferred mono-ester is the terephthalic acid monomethyl ester obtained, for instance, according to the process disclosed in U.S. Patent No. 2,653,165 of Levine.

The alkali metal salts of the mono-esters of terephthalic acid are obtained, for instance, by reaction of said mono-esters with alkali metal hydroxides, alkali metal carbonates, alkali metal bicarbonates and the like. Especially suitable is sodium carbonate or bicarbonate. The salts are produced either in aqueous or in anhydrous medium.

The preferred process consists in dissolving the mono-ester, for instance, monomethyl terephthalate in excess ethylene glycol, while heating at a temperature between about 80° C. and about 180° C. and preferably between about 100° C. and about 140° C., and adding to the resulting solution the calculated, i.e. equimolecular amount of a solid alkali metal compound, for instance, sodium hydroxide, sodium carbonate, sodium bicarbonate and the like. The resulting reaction mixture is then heated at a temperature between about 40° C. and about 150° C. and preferably at a temperature between about 80° C. and about 125° C. and in a vacuum, whereby methanol, split off during said re-esterification reaction, and, if present, water, are distilled off. Subsequently, part of the excess ethylene glycol is also distilled off. The resulting solution of the alkali metal salt of terephthalic acid mono-(β-hydroxy ethyl) ester in ethylene glycol is then converted by metathesis with a suitable soluble alkaline earth metal compound into the corresponding alkaline earth metal salt. Calcium compounds, for instance, calcium chloride are especially suitable for such metathesis reaction. Soluble magnesium, strontium, and barium compounds such as magnesium acetate, strontium chloride, barium chloride may also be used for the purpose of the present invention. It is, of course, understood that the respective alkaline earth metal salts must be soluble in ethylene glycol and its solubility therein must be substantially greater than that of the resulting alkaline earth metal salt of terephthalic acid mono-(β-hydroxy ethyl) ester. The alkaline earth metal salts of terephthalic acid mono-(β-hydroxy ethyl) ester which are difficultly soluble in organic solvents are precipitated and obtained in a form which permits their ready filtration so that ethylene glycol, soluble salts and other impurities present in the reaction mixture can readily be removed by washing with water and/or organic solvents. The pure terephthalic acid mono-(β-hydroxy ethyl) ester is obtained by decomposition of the alkaline earth metal salt of terephthalic acid mono-(β-hydroxy ethyl) ester by means of strong acids. The resulting mono-ester may further be purified, if necessary, by recrystallization from water, methanol, or the like.

The alkaline earth metal salts of terephthalic acid mono-(β-hydroxy ethyl) ester are decomposed, for instance, by suspending the salt in hot water and adding thereto hydrochloric acid or another mineral acid which forms a soluble salt with the alkaline earth metal. On cooling the resulting solution, the terephthalic acid mono-(β-hydroxy ethyl) ester crystallizes in a very pure form.

It is also possible to react the alkaline earth metal salt of terephthalic acid mono-(β-hydroxy ethyl) ester in suspension in hot water with an acid which forms an insoluble salt with the alkaline earth metal such as with sulfuric acid or carbon dioxide. The insoluble alkaline earth metal sulfate or carbonate produced thereby is filtered off and the resulting solution is cooled to cause crystallization of the pure terephthalic acid mono-(β-hydroxy ethyl) ester. This method, however, does not produce as good results as they are achieved by proceeding according to the first mentioned method because contamination of the desired ester cannot always be avoided.

The following examples serve to illustrate the present invention without, however, limiting the same thereto.

EXAMPLE 1

180 g. of terephthalic acid mono-methyl ester are dissolved in 1500 cc. of ethylene glycol while heating the mixture to a temperature of 125° C. 84 g. of finely pulverized sodium bicarbonate are added to the clear solution while stirring vigorously. The sodium bicarbonate is added portion by portion so as to avoid too vigorous carbon dioxide development. Subsequently methanol, water, and part of the excess of ethylene glycol are distilled off in a water jet vacuum. The distillate amounts to 360 g. 55 g. of pulverized anhydrous calcium chloride are added at 110° C. to the resulting clear solution of the sodium salt of terephthalic acid mono-(β-hydroxy ethyl) ester while stirring vigorously. The calcium salt of terephthalic acid mono-(β-hydroxy ethyl) ester crystallizes while the mixture is still hot. It can be filtered off by suction very readily. In contrast thereto, the sodium salt of terephthalic acid mono-(β-hydroxy ethyl) ester does not crystallize at room temperature even when allowing the solution to stand for several days. It is advisable to recycle the filtrate in order to increase the overall yield.

After filtering off by suction the calcium salt of terephthalic acid mono-(β-hydroxy ethyl) ester is washed with water and methanol and is dried. 191 g. of the calcium salt of terephthalic acid mono-(β-hydroxy ethyl) ester are obtained in this manner. The yield corresponds to 83.5% of the theoretical yield.

50 g. of said calcium salt of terephthalic acid mono- ($\beta$-hydroxy ethyl) ester are suspended in 600 cc. of hot water. The suspension is rendered congo acid by the addition of dilute hydrochloric acid. A clear solution is obtained which exhibits faint opalescence that can be eliminated by filtration. On cooling, the terephthalic acid mono-($\beta$-hydroxy ethyl) ester crystallizes. It is filtered off by suction, washed with 50 cc. of water, and dried. 42 g. of terephthalic acid mono-($\beta$-hydroxy ethyl) ester of the following characteristic properties are obtained. The yield is 92% of the theoretical yield.

*Characteristic properties*

| Values | Found | Calculated | Found on recrystallization from methanol |
|---|---|---|---|
| Acid number | 269 | 268 | 268 |
| Saponification number | 536 | 543 | 535 |
| Hydroxyl number | 265 | 268 | 268; 270 |
| Melting point, °C | 175 | | 183 |

EXAMPLE 2

1.8 kg. of terephthalic acid mono-methyl ester are suspended in 4 l. of water at 80° C. while stirring. A solution of 840 g. of sodium bicarbonate in 5 l. of water is slowly added thereto, while continuing stirring. Thereafter, about 6 l. of water are distilled off under reduced pressure and the remaining solution is filtered over activated charcoal at 80° C. The filtrate is allowed to stand in an ice box at 6° C. overnight. The resulting 840 g. of the sodium salt are filtered with suction and washed with a small amount of cold water. The product is dried and pulverized. The sodium salt which is still in solution is recovered by evaporating the mother liquor to dryness. The salt is used for the preparation of terephthalic acid mono-($\beta$-hydroxy ethyl) ester by following the procedure described hereinabove in Example 1.

EXAMPLE 3

94 g. of terephthalic acid mono-isopropyl ester are dissolved in 400 cc. of methanol while heating. The solution is rendered neutral to phenolphthalein by the addition of an N/2 solution of potassium hydroxide. The neutralized solution is filtered over charcoal and the methanol is distilled off. The weight of the resulting dry residue is 107 g.

105 g. of the potassium salt of terephthalic acid mono-isopropyl ester are dissolved in 200 g. of ethylene glycol by refluxing at 150° C. Isopropyl alcohol which is set free by the interchange reaction of the alcohol radicals, is distilled off. 25.3 g. of isopropyl alcohol are obtained (theoretical amount: 25.6 g.).

The weight of the remaining reaction mixture is 278 g. This amount is divided into two parts. Part I is allowed to stand at room temperature for two days. Thereby, no crystallization takes place.

A solution of 11.8 g. of calcium chloride in 25 g. of ethylene glycol is added, while stirring, at 130° C. to part II the weight of which is 139 g. Stirring is continued for 20 minutes. The precipitate is filtered off by suction, washed with water, and dried. 35.4 g. (72% of the theoretical yield) of calcium salt are obtained. The calcium salt is suspended in 350 cc. of water. The mixture is rendered congo acid by the addition of hydrochloric acid at 95° C. A faint turbidity is eliminated by filtration. On cooling, 26 g. of terephthalic acid mono-($\beta$-hydroxy ethyl) ester are obtained. Said product melts at 180° C. Its saponification number is 270.

Part I, the weight of which is also 139 g., is heated in the same manner as part II. However, in place of calcium chloride, 22.9 g. of magnesium acetate dissolved in 30 g. of ethylene glycol are used. The precipitated magnesium salt is thoroughly filtered by suction. The filter cake which still contains some glycol, is dissolved in 300 cc. of water. The resulting solution is rendered congo acid by the addition of dilute hydrochloric acid at 95° C. After filtration and cooling, 17 g. of terephthalic acid mono-($\beta$-hydroxy ethyl) ester are obtained. The product melts at 178° C.

EXAMPLE 4

50 g. of terephthalic acid mono-n-butyl ester are suspended in 200 cc. of water and the suspension is rendered neutral to phenolphthalein by the addition of an N/2 potassium hydroxide solution. The faintly turbid solution is filtered over charcoal and the water is distilled off under reduced pressure to dryness. 54.5 g. of dry residue are obtained. 53 g. of said residue are dissolved in 150 g. of ethylene glycol by refluxing at 160° C. At the same temperature, the n-butyl alcohol which is set free by the interchange reaction of the alcohol radicals is distilled off. The amount of n-butyl alcohol recovered is 14.8 g. (theoretical amount: 15.1 g.). A solution of 24.8 g. of barium chloride in 500 cc. of water is added at 140° C. to the remaining solution while stirring. Stirring is continued during 20 minutes. Thereafter, the water and 70 g. of ethylene glycol are distilled off under reduced pressure. The precipitate is filtered by suction while the solution is still hot and the solvent is removed as far as possible. The resulting barium salt which still contains some glycol is decomposed in 300 cc. of water by means of dilute hydrochloric acid, while heating to boiling, as it is described hereinabove in the preceding examples. The hot solution is filtered. On cooling, 29.6 g. of terephthalic acid mono-($\beta$-hydroxy ethyl) ester are obtained. The product has the acid number 266 and the saponification number 538.

Due to its high purity, the terephthalic acid mono-($\beta$-hydroxy ethyl) ester obtained according to the present invention is especially suitable for producing poly-condensation products and other terephthalic acid compounds. The ester can readily be converted by polycondensation into filaments, fibers, foils, films, and other plastic articles by simply heating the same without any further addition.

The alkaline earth metal salts of terephthalic acid mono-($\beta$-hydroxy ethyl) ester are also useful per se, for instance, as finishing or sizing agents, as fillers, and the like.

Of course, many changes and variations in the manner in which the alkali metal salts of terephthalic acid monoesters are prepared, in the soluble alkaline earth metal salts used for precipitating the alkaline earth metal salts of terephthalic acid mono-($\beta$-hydroxy ethyl) ester, in the manner in which said alkaline earth metal salts are decomposed and the free terephthalic acid mono-($\beta$-hydroxy ethyl) ester is recovered from the decomposition mixture, and the like may be made by those skilled in the art in accordance with the principles set forth herein and in the claims annexed hereto.

I claim:

1. In a process of producing highly purified terephthalic acid mono-($\beta$-hydroxy ethyl) ester, the steps which comprise heating ethylene glycol and an alkali metal salt of a terephthalic acid mono lower alkyl ester at a temperature between about 80° C. and about 180° C., adding to the reaction mixture a soluble alkaline earth metal salt to convert, by metathesis, the resulting alkali metal salt of terephthalic acid mono-($\beta$-hydroxy ethyl) ester into a difficultly soluble alkaline earth metal salt of terephthalic acid mono-($\beta$-hydroxy ethyl) ester and decomposing said alkaline earth metal salt by the addition of a strong acid to form terephthalic acid mono-($\beta$-hydroxy ethyl) ester.

2. In a process of producing terephthalic acid mono-($\beta$-hydroxy ethyl) ester, the steps which comprise dissolving terephthalic acid monomethyl ester in an excess of ethylene glycol, neutralizing said mono-ester by the addition of the equimolecular amount of an alkali metal compound selected from the group consisting of alkali metal carbonates, alkali metal bicarbonates, and alkali metal hydroxides, heating the resulting alkali metal salt of terephthalic acid monomethyl ester in said excess of glycol at a temperature between about 80° C. and about 180° C. to cause re-esterification, adding to the resulting solution of the alkali metal salt of terephthalic acid mono-($\beta$-hydroxy ethyl) ester a soluble alkaline earth metal salt to cause precipitation of the alkaline earth metal salt of terephthalic acid mono($\beta$-hydroxy ethyl) ester, filtering off the insoluble alkaline earth metal salt of terephthalic acid mono-($\beta$-hydroxy ethyl) ester, suspending said alkaline earth metal salt in water, and decomposing the suspended salt by the addition of a strong acid to form the terephthalic acid mono-($\beta$-hydroxy ethyl) ester.

3. In a process of producing highly purified terephthalic acid mono-($\beta$-hydroxy ethyl) ester, the steps which comprise heating at a temperature between about 100° C. and about 140° C. the sodium salt of terephthalic acid mono-methyl ester with ethylene glycol, adding about the equivalent amount of calcium chloride to the reaction mixture, filtering off the precipitated difficultly soluble calcium salt of terephthalic acid mono-($\beta$-hydroxy ethyl) ester, suspending said salt in water, adding hydrochloric acid to said suspension, and filtering off the resulting highly purified terephthalic acid mono-($\beta$-hydroxy ethyl) ester.

4. In the process of producing highly purified terephthalic acid mono-($\beta$-hydroxy ethyl) ester by heating ethylene glycol and an alkali metal salt of a terephthalic acid mono-lower alkyl ester at a temperature between about 80° C. and about 180° C. to form the alkali metal salt of the terephthalic acid mono-($\beta$-hydroxy ethyl) ester, the improvement consisting in adding to the resulting reaction solution an alkaline earth metal salt, soluble in ethylene glycol and water, filtering off the precipitated substantially pure alkaline earth metal salt of terephthalic acid mono-($\beta$-hydroxy ethyl) ester, and decomposing said precipitated alkaline earth metal salt by the addition of a strong acid to form terephthalic acid mono($\beta$-hydroxy ethyl) ester.

5. In the process of producing highly purified terephthalic acid mono-($\beta$-hydroxy ethyl) ester by heating ethylene glycol and an alkali metal salt of a terephthalic acid mono-lower alkyl ester at a temperature between about 80° C. and about 180° C. to form the alkali metal salt of the terephthalic acid mono-($\beta$-hydroxy ethyl) ester, the improvement consisting in adding to the resulting reaction solution a calcium salt, soluble in ethylene glycol and water, filtering off the precipitated substantially pure calcium salt of terephthalic acid mono-($\beta$-hydroxy ethyl) ester, and decomposing said precipitated calcium salt by the addition of a strong acid to form terephthalic acid mono-($\beta$-hydroxy ethyl) ester.

6. In the process of producing highly purified terephthalic acid mono-($\beta$-hydroxy ethyl) ester by heating ethylene glycol and an alkali metal salt of a terephthalic acid mono-lower alkyl ester at a temperature between about 80° C. and about 180° C. to form the alkali metal salt of the terephthalic acid mono-($\beta$-hydroxy ethyl) ester, the improvement consisting in adding to the resulting reaction solution calcium chloride, filtering off the precipitated substantially pure calcium salt of terephthalic acid mono-($\beta$-hydroxy ethyl) ester, and decomposing said precipitated calcium salt by the addition of a strong acid to form terephthalic acid mono-($\beta$-hydroxy ethyl) ester.

References Cited in the file of this patent

UNITED STATES PATENTS

| 2,742,494 | Mraz | Apr. 17, 1956 |
| 2,821,542 | Schmutzler | Jan. 28, 1958 |

FOREIGN PATENTS

| 1,111,848 | France | Nov. 2, 1955 |